(12) United States Patent
Chung (10) Patent No.: US 9,374,694 B2
(45) Date of Patent: Jun. 21, 2016

(54) SOCIAL NETWORK SERVICE PROVIDING SYSTEM AND METHOD FOR SETTING RELATIONSHIP BETWEEN USERS BASED ON MOTION OF MOBILE TERMINAL AND INFORMATION ABOUT TIME

(71) Applicant: NHN Corporation, Seongnam-si (KR)

(72) Inventor: Curtis Youhan Chung, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 14/717,371

(22) Filed: May 20, 2015

(65) Prior Publication Data

US 2015/0256989 A1    Sep. 10, 2015

Related U.S. Application Data

(63) Continuation of application No. 13/414,502, filed on Mar. 7, 2012, now Pat. No. 9,064,286.

(30) Foreign Application Priority Data

Apr. 28, 2011 (KR) .......................... 10-2011-0039993

(51) Int. Cl.
*G06F 15/16* (2006.01)
*H04W 4/20* (2009.01)
(Continued)

(52) U.S. Cl.
CPC ........... *H04W 4/206* (2013.01); *G06F 11/0742* (2013.01); *G06Q 50/01* (2013.01); *H04W 4/023* (2013.01)

(58) Field of Classification Search
CPC .................................................. G06F 11/0742

USPC .......................................................... 709/206
See application file for complete search history.

(56) References Cited

U.S. PATENT DOCUMENTS

2007/0268246 A1* 11/2007 Hyatt ............................ 345/156
2008/0140650 A1   6/2008 Stackpole
(Continued)

FOREIGN PATENT DOCUMENTS

JP    2000-217142    8/2000
JP    2001-265809    9/2001
(Continued)

OTHER PUBLICATIONS

Japanese Office Action issued in corresponding Japanese Patent App. No. 2014-146003, issued Jun. 30, 2015.
(Continued)

*Primary Examiner* — Arvin Eskandarnia
(74) *Attorney, Agent, or Firm* — Greer Burns & Crain Ltd.

(57) ABSTRACT

A social network service providing system and method for setting a relationship between users based on a motion of a mobile terminal, and information about time. The social network service providing system may include a request receiver to receive, from a mobile terminal, a request generated in accordance with a motion of the mobile terminal, an information providing unit to provide location information of the mobile terminal, and information about at least one of a local time when the request is transmitted by the mobile terminal, and an arrival time when the request is received, a mobile terminal identifying unit to identify at least one other mobile terminal based on the location information and the information about the at least one of the local time and the arrival time, and a user information providing unit to provide information about a user of the at least one other mobile terminal.

8 Claims, 7 Drawing Sheets

(51) Int. Cl.
*G06F 11/07* (2006.01)
*H04W 4/02* (2009.01)
*G06Q 50/00* (2012.01)

(56) References Cited

U.S. PATENT DOCUMENTS

| | | |
|---|---|---|
| 2008/0233996 A1 | 9/2008 | Ogasawara et al. |
| 2009/0233629 A1 | 9/2009 | Jayanthi |
| 2011/0065459 A1 | 3/2011 | Cheng et al. |
| 2011/0142016 A1 | 6/2011 | Chatterjee |
| 2011/0179064 A1 | 7/2011 | Russo |
| 2011/0202631 A1* | 8/2011 | Berna Fornies et al. ...... 709/219 |
| 2011/0275317 A1* | 11/2011 | Ryu .............................. 455/41.1 |
| 2012/0011204 A1 | 1/2012 | Morin et al. |
| 2012/0108172 A1* | 5/2012 | Bullen ........................ 455/41.2 |

FOREIGN PATENT DOCUMENTS

| | | |
|---|---|---|
| JP | 2002-149616 | 5/2002 |
| JP | 2003-186900 | 7/2003 |
| JP | 2006-004318 | 1/2006 |
| JP | 2007-287131 | 11/2007 |
| JP | 2009-281800 | 12/2009 |
| JP | 2010-034689 | 2/2010 |
| JP | 2010-81021 | 4/2010 |
| JP | 2010-141578 | 6/2010 |
| JP | 2010-218524 | 9/2010 |
| JP | 2010-237970 | 10/2010 |
| JP | 2011-028670 | 2/2011 |
| JP | 2011-48424 | 3/2011 |
| KR | 10-2009-0044362 | 5/2009 |
| KR | 10-2010-0045312 | 5/2010 |

OTHER PUBLICATIONS

NHN Corp., "http://me2day.net/me2/blog/posts/py9pilc-1xf" published Apr. 27, 2011 by NHN in Korea.

NHN Corp., "http://me2day.net/me2/mobile/smartphone" published Apr. 27, 2011 by NHN in Korea.

NHN Corp., "http://www.nhncorp.com/nhn/pr/pressReleaseDetail.nhn?board.boardNum=21996" published Apr. 27, 2011 by NHN in Korea.

Final Office Action issued on Aug. 21, 2013 in U.S. Appl. No. 13/414,486.

Non-Final Office Action issued on Feb. 7, 2013 in U.S. Appl. No. 13/414,486.

Japanese Office Action for Corresponding Patent Application No. 2011-233793, issued Nov. 19, 2013.

* cited by examiner

SOCIAL NETWORK SERVICE PROVIDING SYSTEM AND METHOD FOR SETTING RELATIONSHIP BETWEEN USERS BASED ON MOTION OF MOBILE TERMINAL AND INFORMATION ABOUT TIME

CROSS REFERENCE TO RELATED APPLICATIONS

This application is a Continuation of application Ser. No. 13/414,502, filed on Mar. 7, 2012, which claims priority from and the benefit of Korean Patent Application No. 10-2011-0039993, filed on Apr. 28, 2011, which is hereby incorporated by reference for all purposes as if fully set forth herein.

BACKGROUND OF THE INVENTION

1. Field of the Invention

Exemplary embodiments of the present invention relate to a social network service providing system and method for setting a relationship between users based on a motion of a mobile terminal, and information about time.

2. Discussion of the Background

According to a conventional technology, in order to form a relationship between users, a user should access a server using a user terminal, and transfer, to the server, information, for example, a phone number or an identification (ID) of another user with whom the user desires to form a relationship such as an online friendship, and the like, by inputting the information using the user terminal. Then, the server places an inquiry with the other user as to whether the other user agrees to form the relationship using the information of the other user, and sets the relationship between the users in accordance with a result of the inquiry.

That is, a series of processes, for example, a process of a user accessing a server to provide information of another user with whom the user desires to form a relationship, a process of the server finding the other user and reaching an agreement, and the like should be performed. Accordingly, problems exist in that such processes cause an inconvenience, incur expenses, and consume a considerable amount of time in the process of providing information and placing an agreement inquiry.

Accordingly, a social network service providing system and method for efficiently setting a relationship between users will be provided herein.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a social network service providing system and method that may form a personal relationship such as a friendship between users only through a motion of generating a motion of mobile terminals, for example, by shaking each mobile terminal, bumping one mobile terminal and the other mobile terminal together, or the like.

Exemplary embodiments of the present invention also provide a social network service providing system and method that may provide, to a user, information about a user of another mobile terminal, using location information of a mobile terminal and distance information determined by the user, in response to a request generated through a motion of the mobile terminal of the user.

Exemplary embodiments of the present invention also provide a social network service providing system and method that may provide information about a user of another mobile terminal using a local time when a request generated through a motion of a mobile terminal is transmitted, or an arrival time when the request is received.

Exemplary embodiments of the present invention also provide a social network service providing system and method that may more accurately identify a target mobile terminal to form a relationship with, using a local time of a mobile terminal when a request is transmitted, or an arrival time when the request is received, in a case where location information of the mobile terminal is inaccurate.

Exemplary embodiments of the present invention also provide a social network service providing system and method that may reduce a waiting time of a user by identifying another mobile terminal to form a relationship with, at every predetermined time, during a time period determined by the user, and providing information about a user of the other mobile terminal.

Additional features of the invention will be set forth in the description which follows, and in part will be apparent from the description, or may be learned by practice of the invention.

An exemplary embodiment of the present invention discloses a social network service providing system, including a request receiver to receive, from a mobile terminal, a request generated in accordance with a motion of the mobile terminal, an information providing unit to provide location information of the mobile terminal, and information about at least one of a local time when the request is transmitted by the mobile terminal, and an arrival time when the request is received, a mobile terminal identifying unit to identify at least one other mobile terminal based on the location information and the information about the at least one of the local time when the request is transmitted by the mobile terminal and the arrival time when the request is received, and a user information providing unit to provide information about a user of the at least one other mobile terminal.

Another exemplary embodiment of the present invention discloses a social network service providing method, including receiving, from a mobile terminal, a request generated in accordance with a motion of the mobile terminal, providing location information of the mobile terminal, and information about at least one of a local time when the request is transmitted by the mobile terminal, and an arrival time when the request is received, identifying at least one other mobile terminal based on the location information and the information about the at least one of the local time when the request is transmitted by the mobile terminal and the arrival time when the request is received, and providing information about a user of the at least one other mobile terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the at least one other element, or intervening elements may be present. In contrast, when an element is referred to as being "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
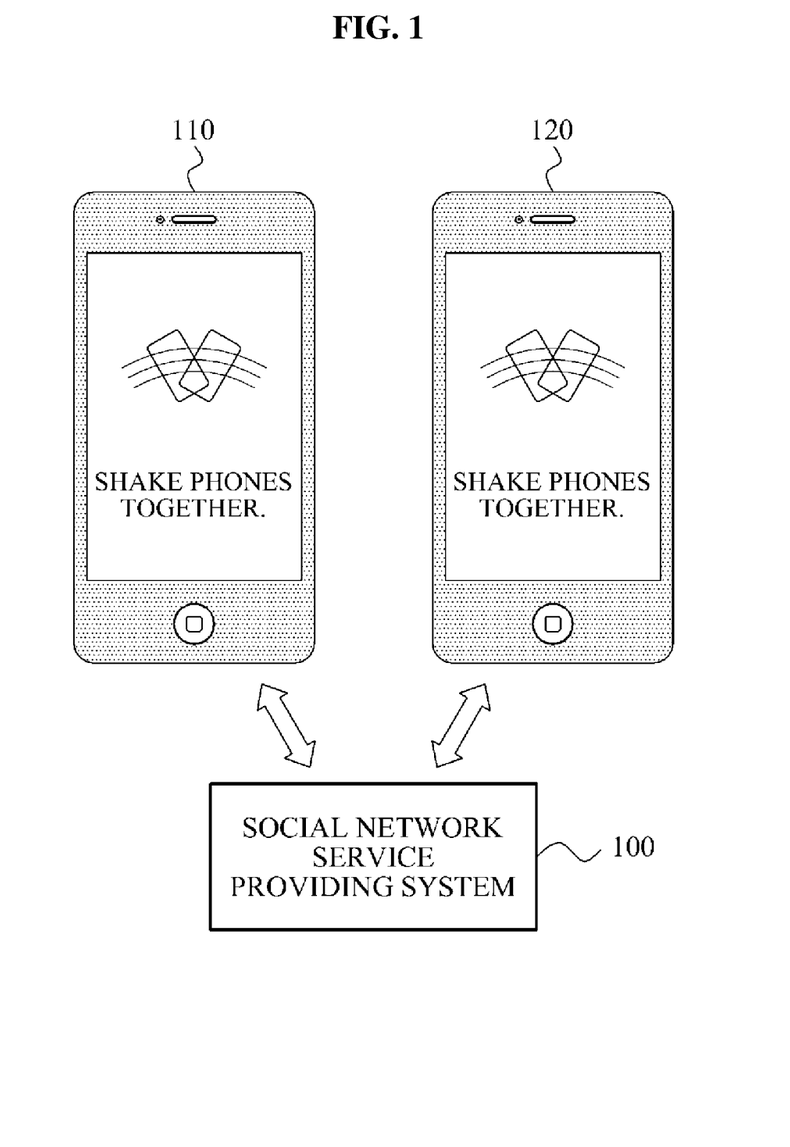
FIG. 1 is a diagram illustrating a configuration for a social network service providing method according to an exemplary embodiment of the present invention.

FIG. 1 is a diagram illustrating a configuration for a social network service providing method according to an exemplary embodiment of the present invention. FIG. 1 illustrates a social network service providing system 100, a first mobile terminal 110, and a second mobile terminal 120.

Here, the system 100 may correspond to a system that may basically form and maintain a personal relationship such as a friendship, and may provide an additional service based on the formed personal relationship, as necessary.

Additionally, the first mobile terminal 110 and the second mobile terminal 120 may refer to terminals owned by a first user and a second user, respectively. Although only two mobile terminals are provided in FIG. 1, a relationship may also be formed among users of at least three mobile terminals using the same method. According to exemplary embodiments of the present invention, a request to form a personal relationship may be transmitted from the mobile terminals to the system 100, through motions of the mobile terminals.

That is, when a first user of the first mobile terminal 110 and a second user of the second mobile terminal 120 want to form a personal relationship such as an online friendship, the first user and the second user may respectively perform a motion, for example, by shaking the first mobile terminal 110 and the second mobile terminal 120, by bumping the first mobile terminal 110 and the second mobile terminal 120 together, or the like. In this instance, each of the first mobile terminal 110 and the second mobile terminal 120 may sense the motion using a sensor, and may provide, to the system 100, a request generated in accordance with the motion.

The system 100 may acquire location information of the first mobile terminal 110, and distance information determined by the first user in accordance with the request received from the first mobile terminal 110. Additionally, the system 100 may acquire location information of the second mobile terminal 120, and distance information determined by the second user in accordance with the request received from the second mobile terminal 120.

That is, the system 100 may acquire location information of a mobile terminal transmitting a request, and distance information determined by a user of the corresponding mobile terminal. Here, the location information may be received by the system 100 through the corresponding mobile terminal, along with the request. The location information may also be received by the system 100 through a separate location information providing system containing the location information of the corresponding mobile terminal. Additionally, the distance information may be determined by a user of the corresponding mobile terminal, stored in the corresponding mobile terminal, and received by the system 100 through the corresponding mobile terminal, along with the request. Also, the distance information may be received by the system 100, and pre-stored in the system 100 when the distance information is determined by a user.

When the system 100 acquires the location information and the distance information of each of the first mobile terminal 110 and the second mobile terminal 120, the system 100 may determine a scope for forming a relationship for each of the mobile terminals, based on the location information and the distance information. Here, the location information may refer to current coordinates of a mobile terminal, and the distance information may refer to information regarding a scope within which at least one other mobile terminal may be searched for, on the basis of the current coordinates of the mobile terminal.

For example, when the distance information corresponds to 50 meters (m), the system 100 may search for at least one other mobile terminal existing within a 50 m radius from a current location of the corresponding mobile terminal. In this instance, the mobile terminal to be searched for may correspond to a mobile terminal having provided the request to form a relationship through the aforementioned motion. That is, when the distance information determined by the first user corresponds to 50 m, and a distance between the first mobile terminal 110 and the second mobile terminal 120 corresponds to 5 m, the second mobile terminal 120 may be included in the at least one other mobile terminal to be searched for by the system 100 in accordance with the request of the first mobile terminal 110. Likewise, when the distance information determined by the second user corresponds to 15 m, and a distance between the first mobile terminal 110 and the second mobile terminal 120 corresponds to 5 m, the first mobile terminal 110 may be included in the at least one other mobile terminal to be searched for by the system 100 in accordance with the request of the second mobile terminal 120.

In this instance, the system 100 may identify the at least one other mobile terminal found, and may provide, to the mobile terminal transmitting the request, information about a user of the at least one other mobile terminal identified. That is, in the aforementioned example, the system 100 may provide, to the first mobile terminal 110, information about a user of the second mobile terminal 120 in response to the request of the first mobile terminal 110. Also, the system 100 may provide, to the second mobile terminal 120, information about a user of the first mobile terminal 110 in response to the request of the second mobile terminal 120.

When a distance between the first mobile terminal 110 and the second mobile terminal 120 corresponds to 20 m, the system 100 may identify the second mobile terminal 120 in accordance with the request of the first mobile terminal 110, and may provide, to the first mobile terminal 110, the information about the user of the identified second mobile terminal 120. However, since the distance information of the second mobile terminal 120 may correspond to 15 m, the first mobile terminal 110 may not be found in accordance with the request of the second mobile terminal 120.

Figure 2:
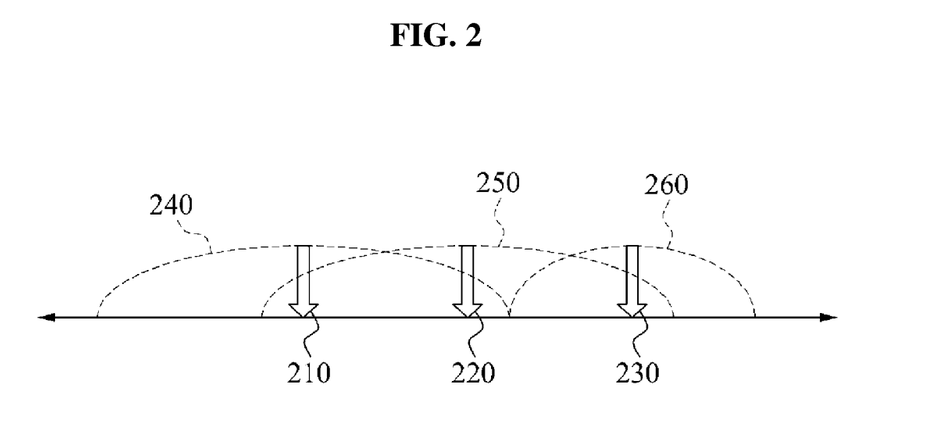
FIG. 2 is a diagram illustrating a method of searching for a mobile terminal based on location information and distance information according to an exemplary embodiment of the present invention.

FIG. 2 is a diagram illustrating a method of searching for a mobile terminal based on location information and distance information according to an exemplary embodiment of the present invention. In FIG. 2, a first arrow 210, a second arrow 220, and a third arrow 230 may simply indicate locations based on location information of a mobile terminal A, a mobile terminal B, and a mobile terminal C, respectively. Additionally, a first dotted curve 240, a second dotted curve 250, and a third dotted curve 260 may indicate a scope within which at least one other mobile terminal may be searched for based on distance information of the mobile terminal A, the mobile terminal B, and the mobile terminal C, respectively.

In FIG. 2, from a point of view of the mobile terminal A, only the mobile terminal B may be found within the scope to be searched. From a point of view of the mobile terminal B, both the mobile terminal A and the mobile terminal C may be found within the scope to be searched. From a point of view of the mobile terminal C, a mobile terminal may not be found within the scope to be searched.

Here, referring to FIGS. 1 and 2 simultaneously, the social network service providing system 100 may provide, to the mobile terminal A, information about a user of the mobile terminal B, in response to a request generated in accordance with a motion of the mobile terminal A. Similarly, the system 100 may provide, to the mobile terminal B, information about users of the mobile terminal A and the mobile terminal C, in response to a request generated in accordance with a motion of the mobile terminal B. However, the system 100 may report, to the mobile terminal C that a user is not found since a mobile terminal is not found in response to a request generated in accordance with a motion of the mobile terminal C.

In this instance, when the information about the user of the mobile terminal B is selected in the mobile terminal A, and the information about the user of the mobile terminal A is selected in the mobile terminal B, the system 100 may set a relationship between the users of the mobile terminal A and the mobile terminal B by associating and storing the information about the user of the mobile terminal A, and the information about the user of the mobile terminal B. That is, the users of the mobile terminal A and the mobile terminal B may form a relationship such as an online friendship.

Additionally, the system 100 may process a one-way request to add a friend. In other words, when information about a user of the mobile terminal C is selected in the mobile terminal B, although a mobile terminal is not found by the mobile terminal C, the system 100 may transfer, to the mobile terminal C, the request of the mobile terminal B to add a friend, and may set a relationship between the users of the mobile terminal B and the mobile terminal C depending on a decision of the user of the mobile terminal C.

Referring to FIG. 1, the system 100 may search for at least one other mobile terminal using at least one of a local time of a mobile terminal when a request according to a motion is transmitted by the mobile terminal, and an arrival time when the request is received by the system 100. For example, when the first mobile terminal 110 transmits a request generated in accordance with a motion of the first mobile terminal 110 at a three hours, three minutes, fifteen seconds mark of the clock, and the second mobile terminal 120 transmits a request generated in accordance with a motion of the second mobile terminal 120 at a three hours, three minutes, sixteen seconds mark of the clock, a difference between the local time when a request is transmitted by the first mobile terminal 110 and the local time when the request is transmitted by the second mobile terminal 120 may correspond to one second. Also, when an arrival time when the request of the first mobile terminal 110 is received by the system 100 corresponds to a three hours, three minutes, twenty seconds mark of the clock, and an arrival time when the request of the second mobile terminal 120 is received by the system 100 corresponds to a three hours, three minutes, twenty-three seconds mark of the clock, a difference between the arrival time of the first mobile terminal 110 and the arrival time of the second mobile terminal 120 may correspond to three seconds. That is, the system 100 may search for the first mobile terminal 110 or the second mobile terminal 120 as a target mobile terminal only when the difference in the local time between terminals is less than a predetermined difference value, or the difference in the arrival time between terminals is less than the predetermined difference value.

The local time when the request is transmitted or the arrival time when the request received may be used in a case where location information of a mobile terminal may be inaccurate, for example, indoors. The predetermined difference value may be adjusted and determined based on a margin of error of the location information. For example, from a point of view of the first mobile terminal 110, when the predetermined difference value corresponds to two seconds, and the difference in the local times when the request is transmitted is used, the second mobile terminal 120 may be found in accordance with the request of the first mobile terminal 110 since the difference in the local times when the request is transmitted corresponds to one second. However, when the predetermined difference value corresponds to two seconds, and the difference in the arrival time when the request is received is used, the second mobile terminal 120 may not be found in accordance with the request of the first mobile terminal 110 since the difference in the arrival times when the request is received corresponds to three seconds. That is, the local time when the request is transmitted or the arrival time when the request is received may be used to guarantee an accuracy of the location information of the mobile terminal. A difference value related to the local time when the request is transmitted, and a difference value related to the arrival time when the request is transmitted may be different, and also may be determined by a user.

Figure 3:
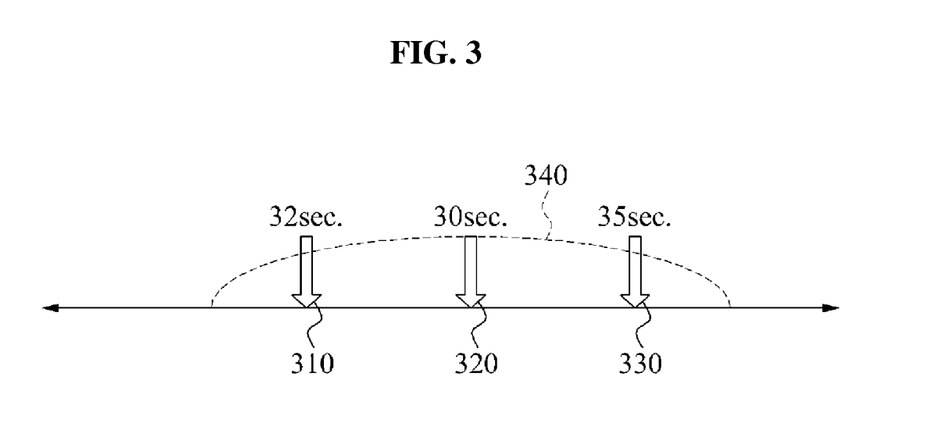
FIG. 3 is a diagram illustrating a method of searching for a mobile terminal based on location information, distance information, and information about a time according to an exemplary embodiment of the present invention.

FIG. 3 is a diagram illustrating a method of searching for a mobile terminal based on location information, distance information, and information about a time according to an exemplary embodiment of the present invention. In FIG. 3, a first arrow 310, a second arrow 320, and a third arrow 330 may simply indicate locations based on location information of a mobile terminal A, a mobile terminal B, and a mobile terminal C, respectively. Additionally, a dotted curve 340 may indicate a scope within which at least one other mobile terminal may be searched for based on distance information of the mobile terminal B. Here, times represented on the first arrow 310, the second arrow 320, and the third arrow 330 may indicate local times of the mobile terminal A, the mobile terminal B, and the mobile terminal C, respectively. It may be assumed that a predetermined difference value in relation to time may correspond to three seconds.

When only location information and distance information are used, from a point of view of the mobile terminal B, both the mobile terminal A and the mobile terminal C may be found in accordance with a request of the mobile terminal B. However, when an accuracy of the location information is determined to be less than a predetermined value, information about at least one of the local time and the arrival time may be additionally used. In this example, since a difference between the local time of the mobile terminal B and the local time of the mobile terminal C may correspond to five seconds, which is greater than the aforementioned difference value of three seconds, the mobile terminal C may be excluded from a result of the search. That is, information about the local time or information about the arrival time may be used to guarantee an accuracy of the location information.

Referring to FIG. 1, the social network service providing system 100 may use distance information determined by a user. However, according to another exemplary embodiment of the present invention, the system 100 may also use distance information predetermined as a default. For example, the system 100 may only search for other mobile terminals existing within 10 m from the mobile terminal. In this instance, mobile terminals to be found may be limited to mobile terminals transmitting a request according to a motion. The system 100 according to another exemplary embodiment may further use information about at least one of a local time when a request according to a motion is transmitted by the mobile terminal, and an arrival time when the request is received, in order to guarantee an accuracy of the location information.

According to various embodiments of the present invention, the system 100 may search for at least one other mobile terminal during a time period according to the aforementioned difference value after the initial request of the mobile terminal, and may provide, to the mobile terminal transmitting the initial request, information about users of the at least one other mobile terminals found. In this instance, the system 100 may provide, to the mobile terminal, the information about the users of the mobile terminals found at a time after the time period according to the aforementioned difference value expires. Also, the system 100 may continuously provide, to the mobile terminal, the information about the users at every predetermined update time, for example, every one second, or every two seconds until the time period according to the aforementioned difference value expires. In such a case, the update time may be considered a first time period and the difference value may be considered a second time period. Thus, information about the users is provided to the mobile terminal at every first time period during the second time period. The update time may be determined and used in order to reduce an inconvenience of the user by reducing a waiting time of the user. The user may also determine the update time.

Figure 4:
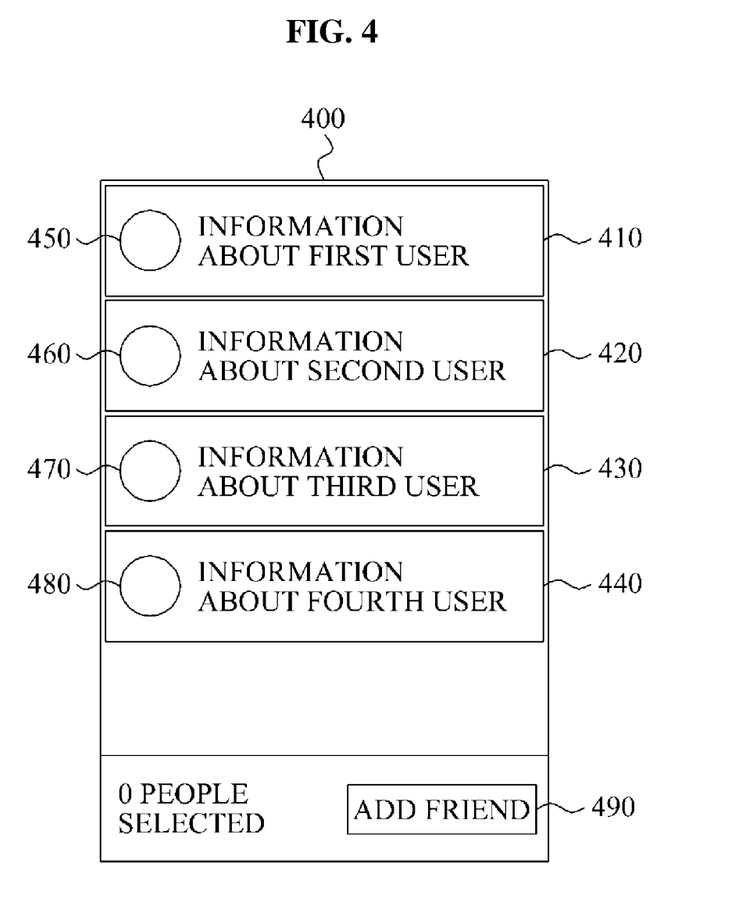
FIG. 4 is a diagram illustrating a partial view of a screen of a mobile terminal to which information about a user is provided according to an exemplary embodiment of the present invention.

FIG. 4 is a diagram illustrating a partial view of a screen 400 of a mobile terminal to which information about a user is provided according to an exemplary embodiment of the present invention. The screen 400 may indicate a part of a screen displaying information about a user. In FIG. 4, information 410 about a first user, information 420 about a second user, information 430 about a third user, information 440 about a fourth user, interfaces 450, 460, 470, and 480 used for selecting a user, and an interface 490 used for transmitting to the social network service providing system 100 described with reference to FIG. 1, a request to add the selected user as a friend may be respectively displayed on the screen 400. That is, a user of the mobile terminal may select information about at least one user using the interfaces 450 through 480 used for selecting the user, and may provide, to the system 100, the information about the selected user using the interface 490 used for transmitting the request to add the user as a friend.

As an example, the system 100 may form a relationship between the users by associating and storing the information about the users based on the information about the user selected in the mobile terminal. As another example, when a one-way request to add a friend is transmitted, the system 100 may provide, to mobile terminals of corresponding users, the request to add the friend using the information about the users, and may form a relationship between the user of the mobile terminal transmitting the initial request, and users accepting the request to add the friend, depending on whether the users receiving the request accept the request.

Figure 5:
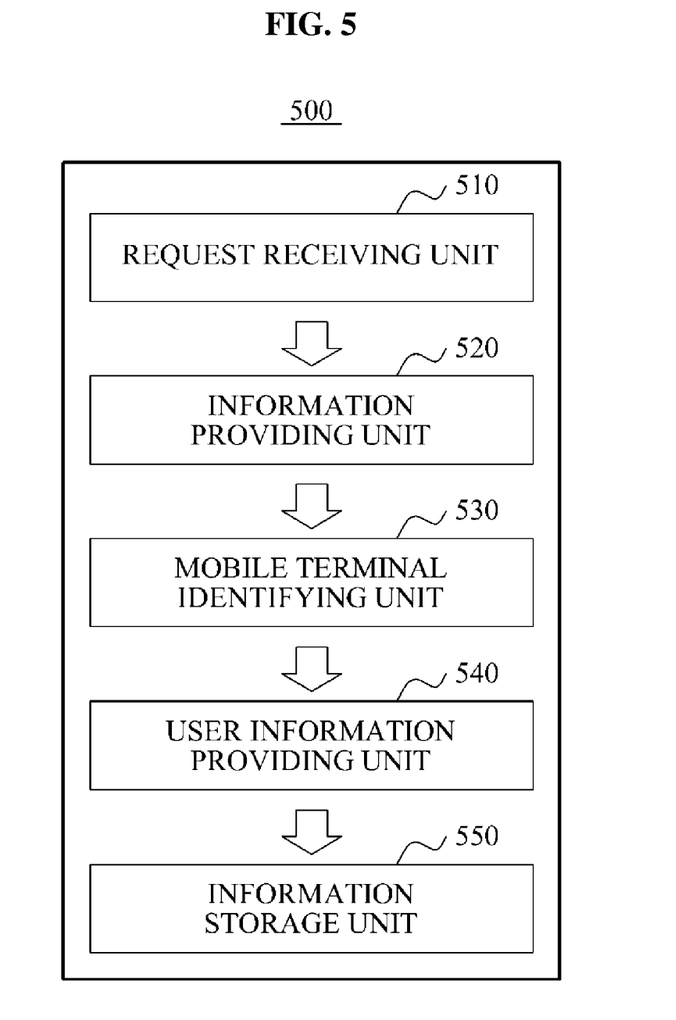
FIG. 5 is a block diagram illustrating a configuration of a social network service providing system according to an exemplary embodiment of the present invention.

FIG. 5 is a block diagram illustrating a configuration of a social network service providing system 500 according to an exemplary embodiment of the present invention. The system 500 may correspond to the social network service providing system 100 according to an exemplary embodiment described with reference to FIG. 1. That is, the system 500 may search for at least one other mobile terminal based on location information of a mobile terminal, and distance information determined by a user of the corresponding mobile terminal.

As illustrated in FIG. 5, the system 500 may include a request receiving unit 510, an information providing unit 520, a mobile terminal identifying unit 530, and a user information providing unit 540. The system 500 may further include an information storage unit 550 selectively, as necessary.

The request receiving unit 510 may receive, from a mobile terminal, a request generated in accordance with a motion of the mobile terminal. Here, the motion of the mobile terminal may be sensed by a sensor included in the mobile terminal.

The information providing unit 520 may provide location information of the mobile terminal, and distance information determined by a user of the mobile terminal. In this instance, the information providing unit 520 may further provide information about at least one of a local time when a request is transmitted by the mobile terminal, and an arrival time when the request is received.

The mobile terminal identifying unit 530 may identify at least one other mobile terminal based on the location information and the distance information. For example, the mobile terminal identifying unit 530 may identify at least one other mobile terminal that may be positioned within a scope determined based on the location information and the distance information. Additionally, the mobile terminal identifying unit 530 may identify, among other mobile terminals transmitting a request according to a motion, the at least one other mobile terminal that may be positioned within the scope determined based on the location information and the distance information. That is, a mobile terminal to be searched for may correspond to at least one other mobile terminal transmitting a request, or may correspond to at least one other mobile terminal that may be positioned within a scope simply determined based on location information and distance information.

When the information providing unit 520 further provides information about at least one of a local time and an arrival time, the mobile terminal identifying unit 530 may identify at least one other mobile terminal based on the information about at least one of the local time and the arrival time. For example, the mobile terminal identifying unit 530 may identify, among mobile terminals transmitting a request according to a motion, at least one other mobile terminal that may be positioned within a scope determined based on the location information and the distance information, and that may have a difference in the local time or a difference in the arrival time less than a predetermined difference value.

Additionally, the mobile terminal identifying unit 530 may identify at least one other mobile terminal at every predetermined time during a time period determined by a user of the mobile terminal. The time period for identifying the at least one other mobile terminal may be determined by the user as aforementioned, however, a time period according to a predetermined default value may also be used. For example, a predetermined difference value may correspond to the time period for identifying the at least one other mobile terminal.

The user information providing unit 540 may provide information about a user of the at least one other terminal. The user information providing unit 540 may further provide, to the at least one other mobile terminal, information about the user of the mobile terminal. In this instance, the information storage unit 550 may associate and store the information about the user of the mobile terminal and the information about the user of the at least one other mobile terminal when the information about the user of the at least one other mobile terminal is selected in the mobile terminal, and the information about the user of the mobile terminal is selected in the at least one other mobile terminal. The information storage unit 550 may also be included in a separate system connected to the system 500, instead of being directly included in the system 500 as aforementioned.

When the mobile terminal identifying unit 530 identifies at least one other mobile terminal at every predetermined time during a time period for identifying the at least one other mobile terminal, the user information providing unit 540 may provide, to the mobile terminal, the information about the user of the at least one other mobile terminal identified, at the every predetermined time.

The system 500 may further include an information maintenance unit (not shown) to maintain, in a database, information about other users forming a relationship with each user. The information maintenance unit may also be included in a separate system connected to the system 500, instead of being directly included in the system 500, as necessary.

Figure 6:
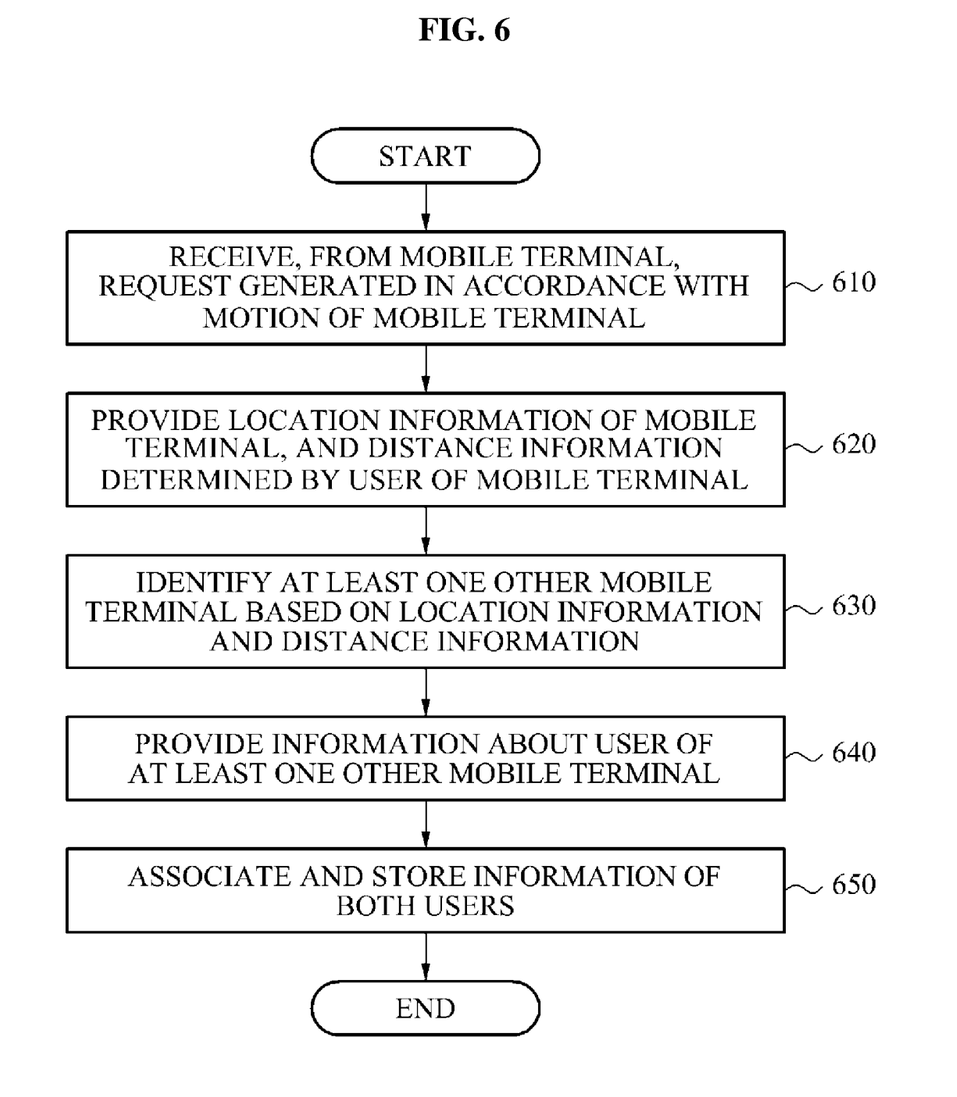
FIG. 6 is a flowchart illustrating a social network service providing method according to an exemplary embodiment of the present invention.

FIG. 6 is a flowchart illustrating a social network service providing method according to an exemplary embodiment of the present invention. The method may be performed by the social network service providing system 500 described with reference to FIG. 5. In FIG. 6, the social network service providing method will be described by describing the system 500 performing each operation of the process. Here, operation 650 may be selectively performed by the system 500, as necessary.

In operation 610, the system 500 may receive, from a mobile terminal, a request generated in accordance with a motion of the mobile terminal. Here, the motion of the mobile terminal may be sensed by a sensor included in the mobile terminal.

In operation 620, the system 500 may provide location information of the mobile terminal, and distance information determined by a user of the mobile terminal. In this instance, the system 500 may further provide information about at least one of a local time when a request is transmitted by the mobile terminal, and an arrival time when the request is received.

In operation 630, the system 500 may identify at least one other mobile terminal based on the location information and the distance information. For example, the system 500 may identify at least one other mobile terminal that may be positioned within a scope determined based on the location information and the distance information. Additionally, the system 500 may identify, among other mobile terminals transmitting a request according to a motion, the at least one other mobile terminal that may be positioned within the scope determined based on the location information and the distance information. That is, a mobile terminal to be searched for may correspond to at least one other mobile terminal transmitting a request, or may correspond to at least one other mobile terminal that may be positioned within a scope simply determined based on location information and distance information.

When information about at least one of a local time when a request is transmitted and an arrival time when a request is received is further provided in operation 620, the system 500 may identify at least one other mobile terminal based on the information about at least one of the local time when a request is transmitted and the arrival time when a request is received. For example, the system 500 may identify, among mobile terminals transmitting a request according to a motion, at least one other mobile terminal that may be positioned within a scope determined based on the location information and the distance information, and that may have a difference in the local time when a request is transmitted or a difference in the arrival time when a request is received less than a predetermined difference value.

Additionally, the system 500 may identify at least one other mobile terminal at every predetermined time during a time period determined by a user of the mobile terminal. The time period for identifying the at least one other mobile terminal may be determined by the user as aforementioned, however, a time period according to a predetermined default value may also be used. For example, a predetermined difference value may correspond to the time period for identifying the at least one other mobile terminal.

In operation 640, the system 500 may provide information about a user of the at least one other terminal. The system 500 may further provide, to the at least one other mobile terminal, information about the user of the mobile terminal. In this instance, the system 500 may associate and store the information about the user of the mobile terminal and the information about the user of the at least one other mobile terminal when the information about the user of the at least one other mobile terminal is selected in the mobile terminal, and the information about the user of the mobile terminal is selected in the at least one other mobile terminal in operation 650. The operation 650 may be performed by a separate system connected to the system 500, instead of being directly performed by the system 500 as aforementioned.

For example, when at least one other mobile terminal is identified at every predetermined time during a time period for identifying the at least one other mobile terminal in operation 630, the system 500 may provide, to the mobile terminal, the information about the user of the at least one other mobile terminal identified, at the every predetermined time.

The system 500 may further perform maintaining (not shown), in a database, information about other users forming a relationship with each user. The maintaining may also be performed by a separate system connected to the system 500, instead of being directly performed by the system 500, as necessary.

FIGS. 1 through 4 may be referred to with reference to descriptions omitted in FIGS. 5 and 6.

Figure 7:
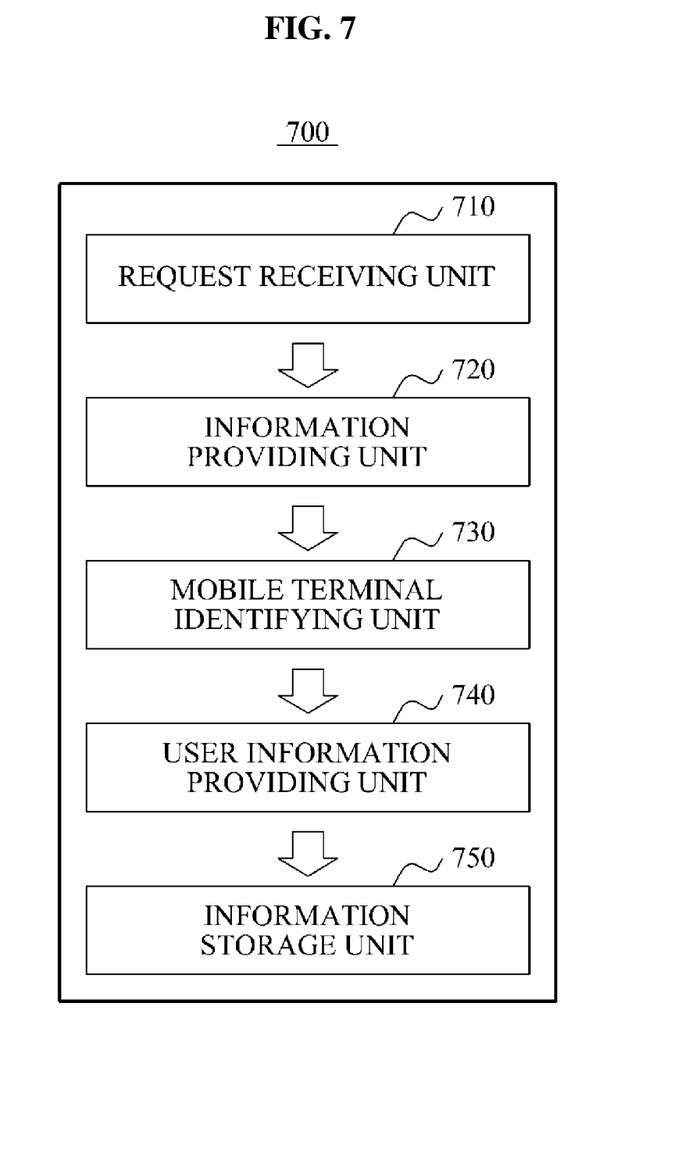
FIG. 7 is a block diagram illustrating a configuration of a social network service providing system according to another exemplary embodiment of the present invention.

FIG. 7 is a block diagram illustrating a configuration of a social network service providing system 700 according to another exemplary embodiment of the present invention. The system 700 may correspond to the social network service providing system 100 according to another exemplary embodiment described with reference to FIG. 1. In particular, the system 700 may search for at least one other mobile terminal based on location information of a mobile terminal, and information about at least one of a local time when a request according to a motion is transmitted by the mobile terminal, and an arrival time when the request is received.

As illustrated in FIG. 7, the system 700 may include a request receiving unit 710, an information providing unit 720, a mobile terminal identifying unit 730, and a user information providing unit 740. The system 700 may further include an information storage unit 750 selectively, as necessary.

The request receiving unit 710 may receive, from a mobile terminal, a request generated in accordance with a motion of the mobile terminal. Here, the motion of the mobile terminal may be sensed by a sensor included in the mobile terminal.

The information providing unit 720 may provide location information of the mobile terminal, and information about at least one of a local time when a request according to a motion is transmitted by the mobile terminal, and an arrival time when the request is received.

The mobile terminal identifying unit 730 may identify at least one other mobile terminal based on the location information and the information about at least one of the local time when a request is transmitted and the arrival time when a request is received. As an example, the mobile terminal identifying unit 730 may identify, among other mobile terminals transmitting a request according to a motion, at least one other mobile terminal that may be positioned within a scope determined based on the location information and predetermined distance information, and that may have a difference in the local time or a difference in the arrival time less than a predetermined difference value. As another example, the mobile terminal identifying unit 730 may identify, among other mobile terminals transmitting a request according to a motion, at least one other mobile terminal that may be positioned within a scope determined based on the location information and distance information determined by a user of the mobile terminal, and that may have a difference in the local time when a request is transmitted or a difference in the arrival time when a request is received, less than a predetermined difference value.

Additionally, the mobile terminal identifying unit 730 may identify at least one other mobile terminal at every predetermined time during a time period determined by the user of the mobile terminal. The time period for identifying the at least one other mobile terminal may be determined by the user as aforementioned, however, a time period according to a predetermined default value may also be used. For example, a predetermined difference value may correspond to the time period for identifying the at least one other mobile terminal.

The user information providing unit 740 may provide information about a user of the at least one other terminal. The user information providing unit 740 may further provide, to the at least one other mobile terminal, information about the user of the mobile terminal. In this instance, the information storage unit 750 may associate and store the information about the user of the mobile terminal and the information about the user of the at least one other mobile terminal when the information about the user of the at least one other mobile terminal is selected in the mobile terminal, and the information about the user of the mobile terminal is selected in the at least one other mobile terminal. The information storage unit 750 may also be included in a separate system connected to the system 700, instead of being directly included in the system 700 as aforementioned.

When the mobile terminal identifying unit 730 identifies at least one other mobile terminal at every predetermined time during a time period for identifying the at least one other mobile terminal, the user information providing unit 740 may provide, to the mobile terminal, the information about the user of the at least one other mobile terminal identified, at the every predetermined time.

The system 700 may further include an information maintenance unit (not shown) to maintain, in a database, information about other users forming a relationship with each user. The information maintenance unit may also be included in a separate system connected to the system 700, instead of being directly included in the system 700, as necessary.

Figure 8:
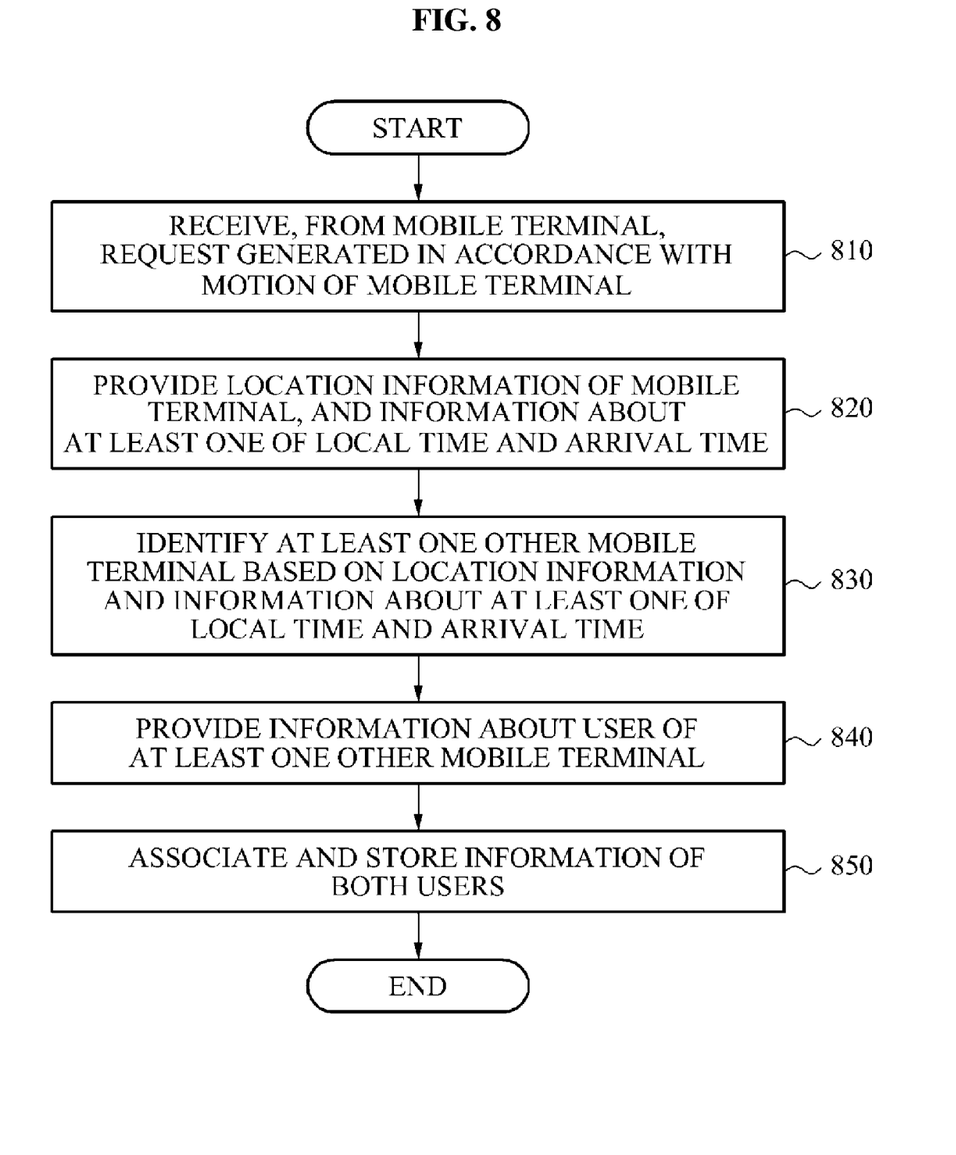
FIG. 8 is a flowchart illustrating a social network service providing method according to another exemplary embodiment of the present invention.

FIG. 8 is a flowchart illustrating a social network service providing method according to another exemplary embodiment of the present invention. The method may be performed by the social network service providing system 700 described with reference to FIG. 7. In FIG. 8, the social network service providing method will be described by describing a process of performing each operation by the system 700. Here, operation 850 may be selectively performed by the system 700, as necessary.

In operation 810, the system 700 may receive, from a mobile terminal, a request generated in accordance with a motion of the mobile terminal. Here, the motion of the mobile terminal may be sensed by a sensor included in the mobile terminal.

In operation 820, the system 700 may provide location information of the mobile terminal, and information about at least one of a local time when a request is transmitted by the mobile terminal, and an arrival time when the request is received.

In operation 830, the system 700 may identify at least one other mobile terminal based on the location information and the information about at least one of the local time when a request is transmitted and the arrival time when a request is received. As an example, the system 700 may identify at least one other mobile terminal that may be positioned within a scope determined based on the location information and predetermined distance information, and that may have a difference in the local time when a request is transmitted and a difference in the arrival time when a request is received, less than a predetermined difference value. As another example, the system 700 may identify, among other mobile terminals transmitting a request according to a motion, at least one other mobile terminal that may be positioned within a scope determined based on the location information and distance information determined by a user of the mobile terminal, and that may have a difference in the local time when a request is transmitted and a difference in the arrival time when a request is received, less than a predetermined difference value.

In operation 840, the system 700 may provide information about a user of the at least one other terminal. The system 700 may further provide, to the at least one other mobile terminal, information about the user of the mobile terminal. In this instance, the system 700 may associate and store the information about the user of the mobile terminal and the information about the user of the at least one other mobile terminal when the information about the user of the at least one other mobile terminal is selected in the mobile terminal, and the information about the user of the mobile terminal is selected in the at least one other mobile terminal in operation 850. The operation 850 may be performed by a separate system connected to the system 700, instead of being directly performed by the system 700 as aforementioned.

For example, when at least one other mobile terminal is identified at every predetermined time during a time period for identifying the at least one other mobile terminal in operation 830, the system 700 may provide, to the mobile terminal, the information about the user of the at least one other mobile terminal identified, at the every predetermined time.

The system 700 may further perform maintaining (not shown), in a database, information about other users forming a relationship with each user. The maintaining may also be performed by a separate system connected to the system 700, instead of being directly performed by the system 700, as necessary.

FIGS. 1 through 4 may be referred to with reference to descriptions omitted in FIGS. 7 and 8.

According to exemplary embodiments of the present invention, it is possible to form a personal relationship such as a friendship between users through a motion of generating a motion of a mobile terminal, for example, by shaking each mobile terminal, bumping one mobile terminal and the other mobile terminal together, or the like.

Also, it is possible to provide, to a user, information about a user of at least one other mobile terminal, using location information of a mobile terminal and distance information determined by the user, in response to a request generated through a motion of the mobile terminal of the user. Additionally, it is possible to provide, to a user, information about a user of at least one other mobile terminal using a local time when a request generated through a motion of a mobile terminal is transmitted, or an arrival time when the request is received.

Also, it is possible to more accurately identify a target mobile terminal to form a relationship with, using a local time of a mobile terminal when a request is transmitted, or an arrival time when the request is received, in a case where location information of the mobile terminal is inaccurate. Additionally, it is possible to reduce a waiting time of a user by identifying at least one other mobile terminal to form a relationship with at every predetermined time during a time period determined by the user, and providing information about a user of the at least one other mobile terminal.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

According to exemplary embodiments of the present invention, it is possible to form a personal relationship such as a friendship between users through a motion of generating a motion of mobile terminals, for example, by shaking each mobile terminal, bumping one mobile terminal and the other mobile terminal together, or the like.

According to exemplary embodiments of the present invention, it is possible to provide, to a user, information about a user of at least one other mobile terminal, using location information of a mobile terminal and distance information determined by the user, in response to a request generated through a motion of the mobile terminal of the user.

According to exemplary embodiments of the present invention, it is possible to provide information about a user of at least one other mobile terminal using a local time when a request generated through a motion of a mobile terminal is transmitted, or an arrival time when the request is received.

According to exemplary embodiments of the present invention, it is possible to more accurately identify a target mobile terminal to form a relationship with, using a local time of a mobile terminal when a request is transmitted, or an arrival time when the request is received, in a case where location information of the mobile terminal is inaccurate.

According to exemplary embodiments of the present invention, it is possible to reduce a waiting time of a user by identifying at least one other mobile terminal to form a relationship with, at every predetermined time during a time period determined by the user, and providing information about a user of the at least one other mobile terminal.

Although a few exemplary embodiments of the present invention have been shown and described, the present invention is not limited to the described exemplary embodiments. Instead, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A social network service providing system, comprising:
a non-transitory storage device;
a request receiving unit stored on the storage device and configured to receive, from a mobile terminal, a request generated in accordance with a motion of the mobile terminal;
an information providing unit configured to provide location information of the mobile terminal and information about at least one of a local time when the request is transmitted by the mobile terminal and an arrival time when the request is received by the request receiving unit;
a mobile terminal identifying unit configured to identify, among other mobile terminals each of which transmits a request in accordance with a motion thereof to the request receiving unit, at least one other mobile terminal that is positioned within a scope determined based on the location information and distance information and that has a first difference between the local time and a local time when the request is transmitted by one of the other mobile terminals or a second difference between the arrival time and an arrival time when the request is received by said one of the other mobile terminals, the first and the second differences being less than a reference value;
a user information providing unit configured to provide a first request to add a user of the at least one other mobile terminal as a friend, which includes first information about the user of the at least one other mobile terminal, to the mobile terminal and a second request to add a user of the mobile terminal as a friend, which includes second information about the user of the mobile terminal, to the at least one other mobile terminal; and
an information storage unit configured to associate and store, when the first request is accepted by the mobile terminal and the second request is accepted by the at least one other mobile terminal, the first information and the second information to allow to form a relationship between the user of the mobile terminal and the user of the at least one other mobile terminal.

2. The system of claim 1, wherein the distance information is determined by the user of the mobile terminal.

3. The system of claim 1, further comprising:
a user information maintenance unit configured to maintain, in a database, information about each of users which forms a relationship with at least one other user.

4. The system of claim 1, wherein the mobile terminal identifying unit is configured to identify the at least one other mobile terminal at every first time period during a second time period, at least one of the first time period and the second time period being determined by the user of the mobile terminal, and
wherein the user information providing unit is configured to provide, to the mobile terminal, the first information at said every first time period.

5. A social network service providing method, comprising:
receiving, from a mobile terminal, a request generated in accordance with a motion of the mobile terminal;
providing location information of the mobile terminal and information about at least one of a local time when the request is transmitted by the mobile terminal and an arrival time when the request is received;
identifying, among other mobile terminals each of which transmits a request in accordance with a motion thereof, at least one other mobile terminal that is positioned within a scope determined based on the location information and distance information and that has a first difference between the local time and a local time when the request is transmitted by one of the other mobile terminals or a second difference between the arrival time and an arrival time when the request is received by said one of the other mobile terminals, the first and the second differences being less than a reference value; and
providing a first request to add a user of the at least one other mobile terminal as a friend, which includes first information about the user of the at least one other mobile terminal, to the mobile terminal and a second request to add a user of the mobile terminal as a friend, which includes second information about the user of the mobile terminal, to the at least one other mobile terminal; and
associating and storing, when the first request is accepted by the mobile terminal and the second request is accepted by the at least one other mobile terminal, the first information and the second information to allow to form a relationship between the user of the mobile terminal and the user of the at least one other mobile terminal.

6. The method of claim 5, wherein the distance information is determined by the user of the mobile terminal.

7. The method of claim 5, further comprising:
maintaining, in a database, information about each of users which forms a relationship with at least one other user.

8. The method of claim 5, wherein the identifying comprises identifying the at least one other mobile terminal at every first time period during a second time period, at least one of the first time period and the second time period being determined by the user of the mobile terminal, and
wherein the providing the first request comprises providing, to the mobile terminal, the first information at said every first time period.

\* \* \* \* \*